(12) United States Patent
Berche et al.

(10) Patent No.: US 8,961,137 B2
(45) Date of Patent: Feb. 24, 2015

(54) TURBINE WHEEL FOR A TURBINE ENGINE

(75) Inventors: Emmanuel Berche, Vernou la Celle sur Seine (FR); Jean-Luc Bacha, Paris (FR); Tangi Brusq, Fontainebleau (FR)

(73) Assignee: Snecma, Paris (FR)

( * ) Notice: Subject to any disclaimer, the term of this patent is extended or adjusted under 35 U.S.C. 154(b) by 307 days.

(21) Appl. No.: 13/448,830

(22) Filed: Apr. 17, 2012

(65) Prior Publication Data
US 2012/0269650 A1    Oct. 25, 2012

(30) Foreign Application Priority Data

Apr. 19, 2011 (FR) ...................................... 11 53373

(51) Int. Cl.
| F01D 5/18 | (2006.01) |
| F01D 25/06 | (2006.01) |
| F01D 5/08 | (2006.01) |
| F01D 5/26 | (2006.01) |
| F01D 11/00 | (2006.01) |

(52) U.S. Cl.
CPC ....... *F01D 5/082* (2013.01); *F01D 5/26* (2013.01); *F01D 11/008* (2013.01); *F05B 2240/33* (2013.01); *F05D 2260/36* (2013.01); *F05D 2260/201* (2013.01); *F05D 2260/22141* (2013.01); *F05D 2260/2214* (2013.01); *Y02T 50/676* (2013.01); *F05D 2240/81* (2013.01); *Y10S 416/50* (2013.01)
USPC ........ 416/97 R; 416/95; 416/190; 416/193 A; 416/248; 416/500

(58) Field of Classification Search
USPC .......... 416/95, 96 R, 96 A, 97 R, 193 A, 248, 416/500, 190; 415/115
See application file for complete search history.

(56) References Cited

U.S. PATENT DOCUMENTS

| 3,119,595 | A |   | 1/1964 | Wilson, III et al. |
| 4,457,668 | A |   | 7/1984 | Hallinger |
| 4,712,979 | A |   | 12/1987 | Finger |
| 5,281,097 | A |   | 1/1994 | Wilson et al. |
| 6,017,189 | A | * | 1/2000 | Judet et al. .................. 416/97 R |
| 6,457,935 | B1 | * | 10/2002 | Antunes et al. ............... 415/115 |

(Continued)

FOREIGN PATENT DOCUMENTS

| EP | 0 856 641 A1 | 8/1998 |
| EP | 1 164 253 A1 | 12/2001 |

(Continued)

OTHER PUBLICATIONS

Search Report issued Aug. 7, 2012 in United Kingdom Patent Application No. GB1206497.8.

(Continued)

*Primary Examiner* — Christopher Verdier
(74) *Attorney, Agent, or Firm* — Oblon, Spivak, McClelland, Maier & Neustadt, L.L.P.

(57) ABSTRACT

A turbine wheel for a turbine engine, comprising a disk carrying blades, each having a platform carrying an airfoil and connected by a tang to a root, and sealing and damping sheets housed in the inter-tang spaces, the platforms including projections on their radially internal faces against which the sheets bear radially in operation, in order to define radial clearance and create at least one space between the sheets and the platforms, and the sheets including holes for feeding air to the or each space.

11 Claims, 4 Drawing Sheets

(56) References Cited

U.S. PATENT DOCUMENTS

| | | | |
|---|---|---|---|
| 2004/0109764 A1* | 6/2004 | Tiemann | 416/97 R |
| 2005/0175463 A1 | 8/2005 | Giot et al. | |
| 2009/0010762 A1 | 1/2009 | Caucheteux et al. | |
| 2009/0263235 A1 | 10/2009 | Tibbott et al. | |
| 2010/0040479 A1* | 2/2010 | Spangler et al. | 416/97 R |
| 2010/0158686 A1 | 6/2010 | Kim et al. | |

FOREIGN PATENT DOCUMENTS

| | | |
|---|---|---|
| EP | 1 380 726 A2 | 1/2004 |
| EP | 2 180 142 A1 | 4/2010 |
| FR | 2 963 382 | 2/2012 |
| JP | 62-251404 | 11/1987 |
| WO | WO 2010/103551 A1 | 9/2010 |

OTHER PUBLICATIONS

French Preliminary Search Report issued Nov. 15, 2011, in Patent Application No. FR 1153373, Filed on Apr. 19, 2011 (With English Translation of Category of Cited Documents).

U.S. Appl. No. 13/659,141, filed Oct. 24, 2012, Berche, et al.

* cited by examiner

TURBINE WHEEL FOR A TURBINE ENGINE

FIELD OF THE INVENTION

The present invention relates to a turbine wheel for a turbine engine, the wheel comprising a disk carrying blades with roots that are engaged in grooves in the periphery of the disk.

BACKGROUND OF THE INVENTION

Typically, each blade of a turbine wheel comprises an airfoil carried by a platform that is connected to a root by a tang.

The grooves in the disk are regularly spaced apart around the axis of the disk, and between them they define teeth. In the assembled position, the platforms of the blades are spaced a little apart from one another in the circumferential direction and they are spaced apart from the teeth of the disk in the radial direction.

The tangs of the blades are spaced apart from one another in the circumferential direction and between them they define spaces in which damping members are mounted for the purpose of dissipating the energy of the vibration to which the blades are subjected in operation, dissipation being by rubbing against the platforms (EP-A1-0 062 558).

In simple and inexpensive manner, these members are constituted by metal sheets and they also provide radial sealing between the platforms of the blades by bearing radially against the radially internal faces of the platforms.

The blades are held axially in the grooves of the disk by means of annular end plates that are mounted on the disk respectively upstream and downstream, and they bear axially via their peripheries against the blade roots.

In operation, ventilation and cooling air flows from upstream to downstream over the teeth of the disk.

Proposals have already been made to use some of this flow of ventilation air for cooling the blade platforms, which platforms are subjected to high temperatures in operation. One solution consists in providing circuits for passing cooling air in the sealing members that are formed by blocks of relatively thick material. The air that passes along the circuits serves to impact against the internal faces of the platforms (see for example EP-A2-2 110 515).

Nevertheless, that solution is not satisfactory since the above-mentioned circuits are difficult to make and they increase the cost of fabricating the members and also their weight.

OBJECT AND SUMMARY OF THE INVENTION

A particular object of the invention is to provide a solution that is simple, effective, and inexpensive to the above-mentioned problem of the prior art.

To this end, the invention provides a turbine wheel for a turbine engine, comprising a disk carrying blades, each having a platform carrying an airfoil and connected by a tang to a root, the roots of the blades being engaged in grooves in the periphery of the disk and their tangs leaving between them spaces for housing sealing and damping sheets, at least one airflow space being formed between the internal faces of the platforms and the above-mentioned sheets, the sheets including air-passing holes for feeding the or each space with air and for cooling the platforms, wherein the platforms include studs or lugs on their radially internal faces that form projections against which the sheets bear radially and that define radial clearance between the sheets and the internal faces of the platforms.

The projections formed on the radially internal faces of the platforms bear against the sheets and hold them spaced apart from the internal faces of the platforms so as to create one or more air flow spaces extending substantially over the entire longitudinal extent of the sheets. The radial extent of each space is equal to the radial extent or thickness of the projections, and for example it is about 1 millimeter (mm). A portion of the air flow passing over the teeth of the disk in operation passes via the holes in the sheets, impacts against the internal faces of the platforms, and then flows between the sheets and the platforms so as to cool the platforms and reduce their temperature gradients.

Furthermore, the projections increase the heat exchange areas between the cooling air and the platforms, thereby improving the effectiveness of cooling compared with the prior art.

The circumferential clearance between the sheets and the tangs or the roots of the blades is substantially zero, so as to conserve a maximum amount of ventilation air flowing towards the downstream plate for holding the blades.

Each sheet may have at least one or two rows of holes, the rows of holes extending substantially parallel to the longitudinal axis of the wheel. The holes are preferably regularly spaced apart from one another. Advantageously, each sheet has two parallel rows of holes that are spaced apart from each other in the circumferential direction, the holes in a first row opening out radially to the inside of an internal face of one platform, and the holes of the second row opening out radially to the inside of an internal face of an adjacent platform.

Each sheet is preferably in the form of an elongate dish having its concave side facing radially inwards and having the above-mentioned holes in its bottom wall.

Advantageously, the end wall of each sheet has a cross section of undulating shape including an outwardly convex middle portion situated between two outwardly concave side portions, the middle portion bearing radially outwards against circumferential end portions of the platforms of two adjacent blades. Each sheet thus bears radially against the circumferential end portions of the platforms of the blades between which it is mounted, thereby guaranteeing radial sealing between the platforms of those blades. The concave portions of the sheet situated on either side of the convex portion are designed to bear radially against the projections of the platforms, and each of them co-operates with a blade platform to define an air flow space of the above-mentioned type.

The radial bearing projections of the blade platforms comprise studs or lugs formed on the internal faces of the platforms. The studs or lugs may be generally circular in shape, or they may be oblong, rectangular, or elongate. By way of example they may be substantially cylindrical or hemispherical, and they may be 3, 4, 5, 6, or more in number. The studs or lugs may be obtained by casting or by machining the platforms of the blades. The flow of air passing through the holes in the sheets is intended to flow between the studs or lugs.

The studs or lugs may be arranged along a line that is substantially parallel to the longitudinal axis of the wheel and they may be regularly spaced apart from one another. The line is advantageously situated in a plane substantially containing the longitudinal axis of the turbine wheel and one of the two above-mentioned rows of holes in the corresponding sheet.

The studs or lugs may be spaced apart from one another by a distance that is substantially equal to the distance between two consecutive holes in the sheet. Advantageously, the zone where air impacts against the internal face of the platform is situated between two consecutive studs or lugs.

The present invention also provides a turbine blade for a turbine engine, the blade having a platform carrying an airfoil and connected to a root by means of a tang, wherein the platform has studs or lugs projecting from its radially internal faces.

Finally, the invention also provides a turbine engine, such as an airplane turboprop or turbojet, including at least one turbine wheel of the above-specified type.

BRIEF DESCRIPTION OF THE DRAWINGS

The invention can be better understood, and other details, characteristics, and advantages of the present invention appear more clearly on reading the following description made by way of non-limiting example and with reference to the accompanying drawings, in which.

MORE DETAILED DESCRIPTION

Figure 1:
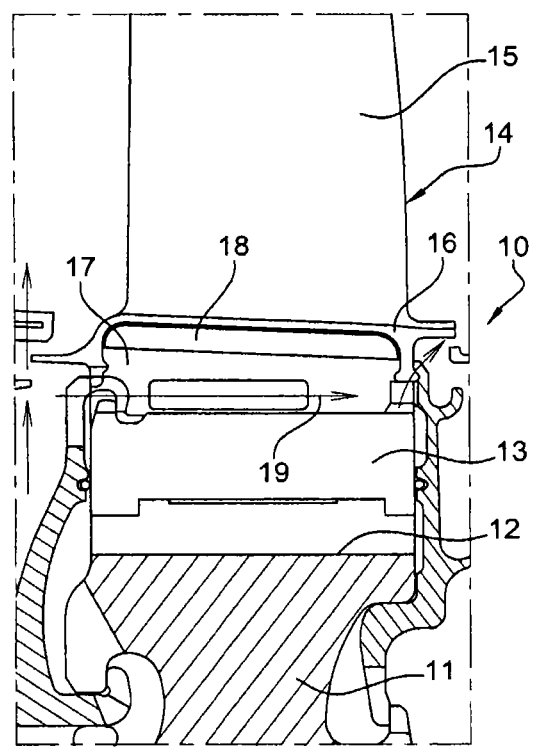
FIG. 1 is a fragmentary diagrammatic view in axial section of a high-pressure turbine wheel of a prior art turbine engine.

Reference is made initially to FIG. 1, which shows a high-pressure turbine wheel 10 of a turbine engine such as an airplane turboprop or turbojet, the wheel 10 comprising a disk 11 having substantially axial grooves 12 in its periphery, which grooves have the roots 13 of blades 14 engaged therein.

The blade roots 13 may be of the type having a Christmas-tree section or a dovetail section, and the grooves 12 of the disk 11 are of shapes complementary to the shapes of the blade roots, defining teeth between one another.

Each blade 14 comprises an airfoil 15 connected at its radially inner end to a platform 16, which is itself connected to a root 13 by a tang 17.

In the assembled position, as can be seen in FIG. 1, the platforms 16 of two consecutive blades 14 are spaced apart from each other in a circumferential direction, and they are spaced apart from the teeth of the disk in a radial direction. The tangs 17 of the blades are spaced apart from one another in the circumferential direction and between them they define inter-tang spaces in which damping sheets 18 are mounted.

Figure 2:
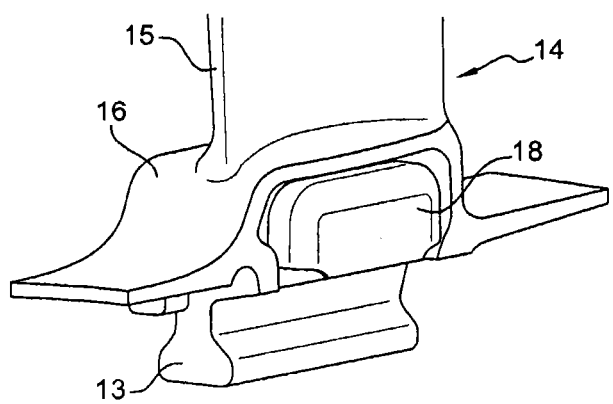
FIG. 2 is a fragmentary diagrammatic view in perspective of a high-pressure turbine blade and of a damping sheet of the prior art.

As can be seen better in FIG. 2, each sheet 18 is a stamping in the form of an elongate dish or gutter with two substantially parallel flanks that are connected together at their radially outer ends by an end wall having a radially outer surface that is designed to rub against the platforms 16 of the blades 14 in order to dissipate the vibratory energy to which the blades are subjected in operation.

Each sheet 18 also provides radial sealing in the circumferential clearance between the platforms 16 of the blades 14, by bearing radially outwards against these platforms.

In operation, ventilation air flows axially from upstream to downstream inside the platforms 16 and wipes against the radially outer ends of the teeth 13 of the disk (arrow 19).

In operation, the platforms 16 of the blades 14 are subjected to high temperatures, thereby causing considerable temperature gradients to appear in the platforms, and possibly giving rise to the formation of cracks that reduce the lifetime of the platforms.

The invention enables this problem to be limited by means for taking a portion of the above-mentioned flow of air for ventilating the teeth of the disk, and causing this air to flow over the inside faces of the platforms.

Figure 3:
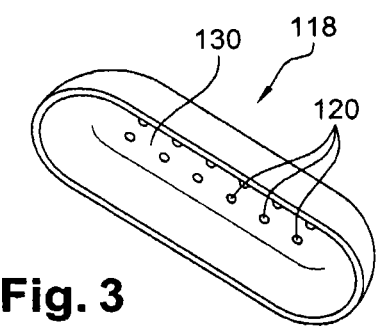
FIG. 3 is a diagrammatic perspective view of a damping sheet of the invention.
Figure 4:
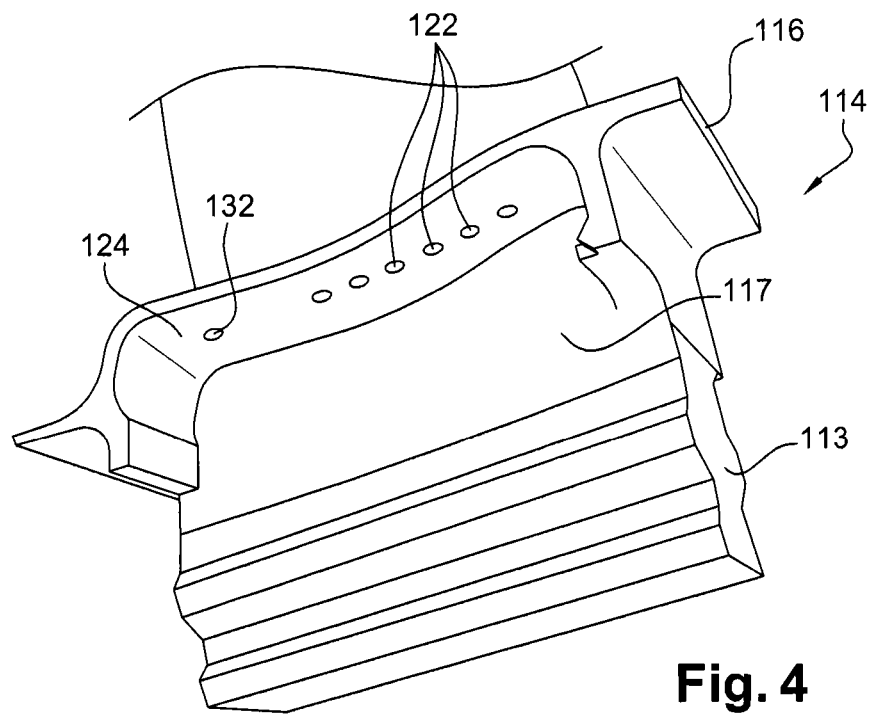
FIG. 4 is a fragmentary diagrammatic view in perspective of a turbine blade of the invention.
Figure 5:
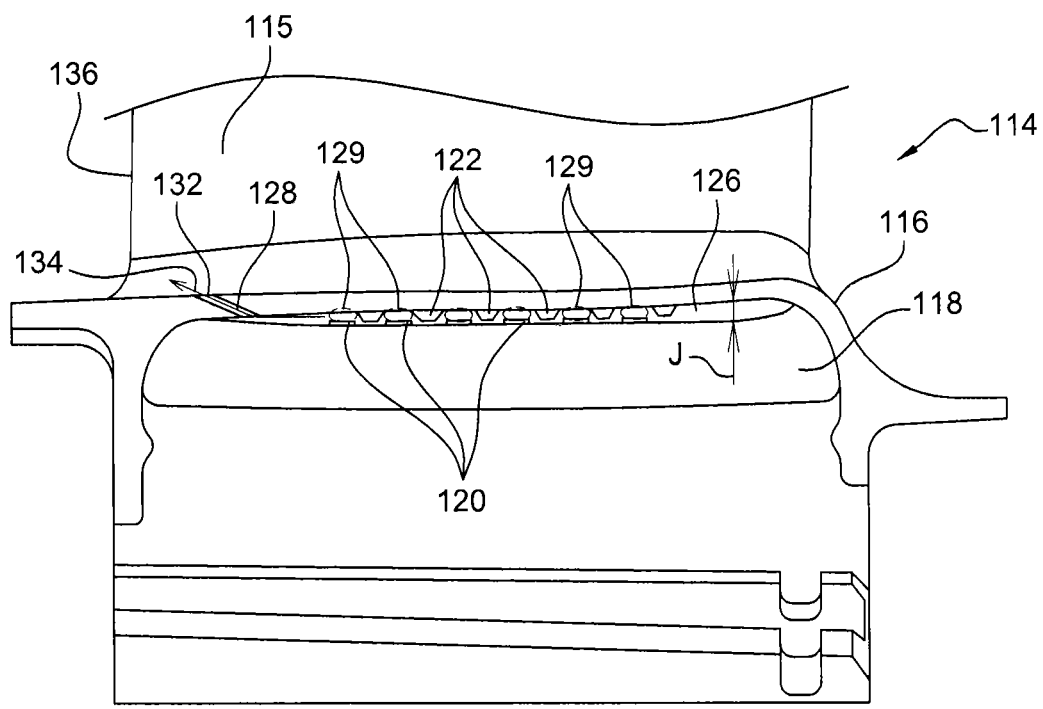
FIG. 5 is a fragmentary diagrammatic view in perspective of the FIG. 4 turbine blade and of the FIG. 3 damping sheet.

In a first embodiment of the invention that is shown in FIGS. 3 to 5, these means comprise air-passing holes 120 formed through the damping sheets 118 (FIG. 3) and projections 122 formed on the radially inner faces 124 of the platforms 116 of the blades 114 of a high-pressure turbine wheel (FIG. 4), these projections 122 serving in operation to form bearing points for the sheets 118 in order to create a gap (in the radial direction) between the sheets 118 and the platforms 116, thereby forming at least one longitudinal space 126 for passing cooling air (arrow 128) between the sheets and the inside faces 124 of the platforms (FIG. 5).

The damping sheet 118 shown in FIG. 3 differs from the prior art sheets in that its end wall 130 includes holes 120 for passing cooling air taken from the flow of air for ventilating the teeth of the disk, as shown in FIG. 1 by arrow 19.

In the example shown, the sheet 118 has two rows of holes 120, each row having six holes. These rows of holes 120 are spaced apart from one another and they are substantially parallel to one another and to the longitudinal axis of the wheel. These orifices are advantageously drilled holes.

In the assembled position, each row of holes 118 is designed to be situated radially inside a lateral inside face 124 of a platform 116, as explained in greater detail below.

The platform 116 of the blade 114 shown in FIG. 4 has two radially-internal lateral faces 124 that are situated on either side of the blade root 113.

Each internal face 124 of the platform has projections 122 against which a sheet 118 bears radially in operation.

In this example, the projections 122 are formed by studs or lugs of substantially hemispherical or cylindrical shape. There are six of these studs or lugs and they are regularly spaced apart from one another and arranged along a line that extends substantially parallel to the longitudinal axis of the blade root 113 and of the wheel.

As can be seen in FIG. 5, the projections 122 bear via their radially inner ends against the end wall of the sheet 118. The radial clearance J defined by these projections 122 has a value equal to the radial extent or thickness of the projections and serves to define each of the above-mentioned longitudinal spaces 126, which spaces are fed with air via the holes 120 in the sheets 118.

A first row of holes 118 in the sheet, and the row of projections 122 of the platform, may be situated in a common plane substantially containing the longitudinal axis of the wheel. The second row of holes in the sheet and the row of projections 122 of an adjacent platform may be situated in another common plane substantially containing the longitudinal axis of the wheel.

In the assembled position, the holes 120 and the projections 122 are arranged in a staggered configuration in one of the above-mentioned planes so that each impact zone 129 where the air leaving an orifice 120 impacts against the platform is situated between two consecutive projections 122 (FIG. 5).

The air that passes through the holes 120 in the sheets thus impacts against the internal faces of the platforms 116 and then flows from upstream to downstream around the projections, and can subsequently be exhausted towards the annular passage through the turbine, via at least one through orifice 132 formed in the platform, close to its downstream end (arrow 134).

In this example, the orifice 132 extends downstream radially outwards and opens out at its downstream end in the vicinity of the trailing edge 136 of the airfoil 115 of the blade, in order to cool it.

Figure 6:
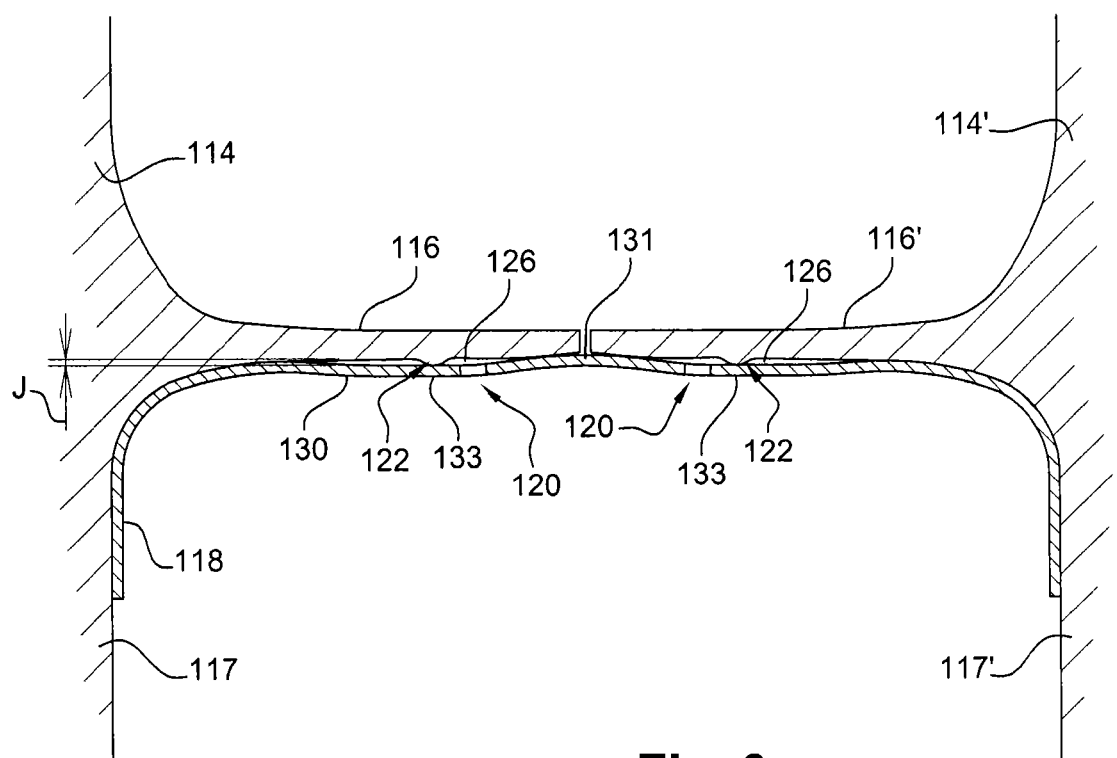
FIG. 6 is a highly diagrammatic view in cross-section of a damping sheet mounted between two adjacent blades of a turbine wheel.

As shown in FIG. 6, the flanks of each sheet 118 are flush with the tangs 117, 117' of two adjacent blades 114, 114' or bear circumferentially thereagainst in order to limit or eliminate leaks of cooling air between the sheets and the tangs.

Furthermore, each sheet 118 bears radially outwards against circumferential end portions of the platforms 116, 116' of the blades 114, 114', thereby providing radial sealing between the platforms.

The end wall 130 of each sheet 118 may have a cross-section of undulating shape (FIG. 6) including an outwardly convex middle portion 131 that bears radially against the above-mentioned end portions of the platforms 116, 116', and that is situated between two outwardly concave portions 133. These concave portions 133 bear radially outwards against the projections 122 of the platforms and each defines an air flow space 126 of the above-specified type.

Furthermore, the positions of the orifices 120 in the sheet 118 may be optimized in order to lessen the temperature gradients in the platforms 116, 116' of the blades. In the example shown, each row of orifices 120 is circumferentially offset relative to the above-mentioned plane containing a row of projections 122 and the longitudinal axis of the wheel, towards the platform adjacent to the platform carrying the projections.

Figure 7:
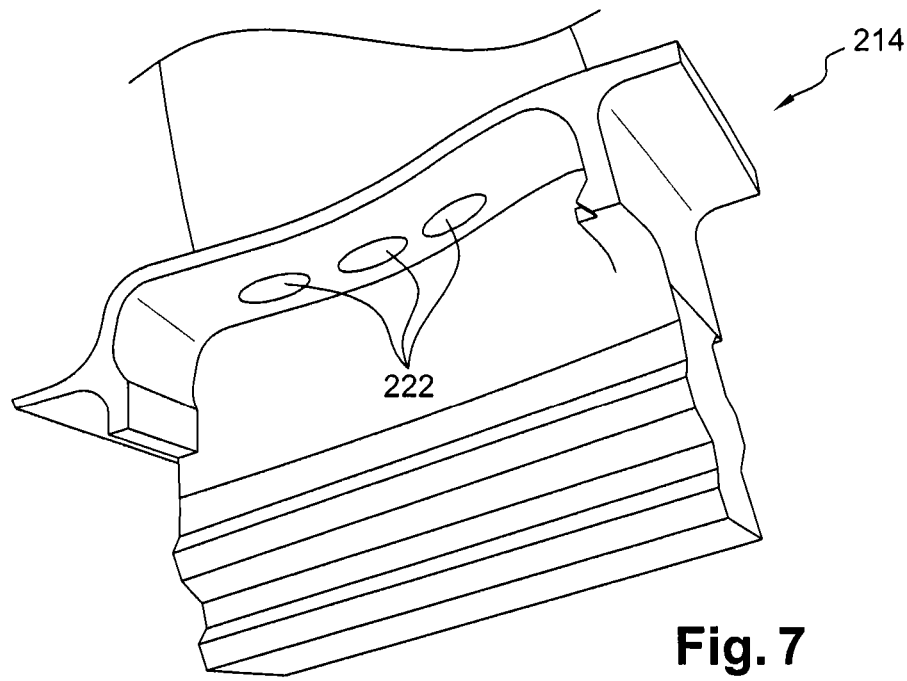
FIGS. 7 and 8 are views similar to FIG. 4 and they show variant embodiments of the turbine blade of the invention.
Figure 8:
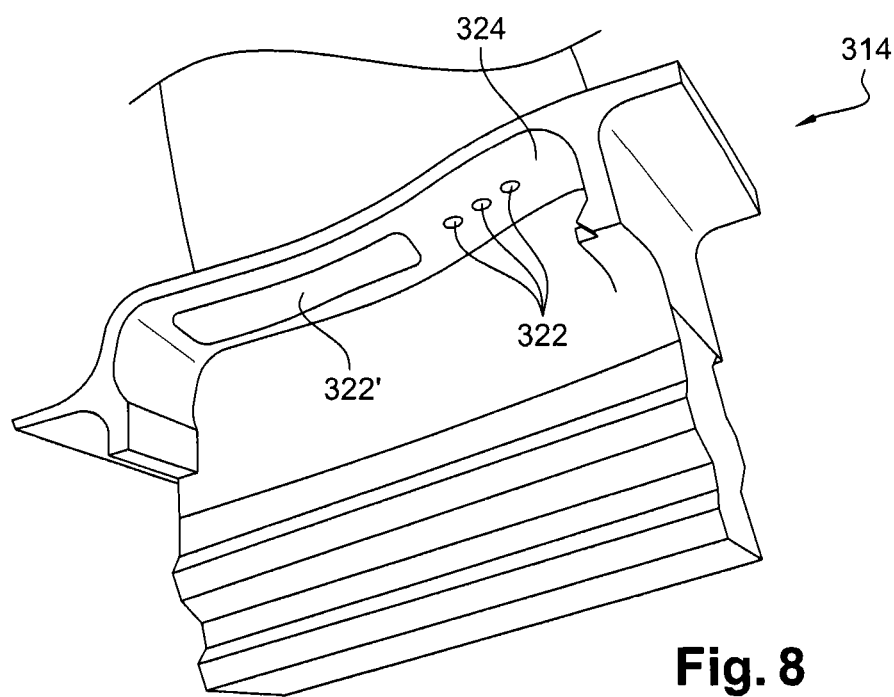

The variant embodiments of turbine blades of the invention shown in FIGS. 7 and 8 differ from the embodiment of FIG. 4 in the number and shape of their projections.

The projections 222 of the blade 214 of FIG. 7 are three in number and they are oblong in shape with a long axis that is substantially parallel to the longitudinal axis of the blade root and to the longitudinal axis of the wheel. The number of holes in the sheet associated with this blade 214 may be equal to or greater than the number of said projections.

The projections 322, 322' of the blade 314 of FIG. 8 are four in number and they are of two different types: projections 322 similar to those described with reference to FIG. 1, which projections are three in number, and a ridge 322' of generally rectangular shape that extends over more than half the longitudinal extent of the internal face 324 of the blade and over substantially the entire circumferential extent of said face.

What is claimed is:

1. A turbine wheel for a turbine engine, comprising a disk carrying blades and sealing and damping sheets, each blade having a platform carrying an airfoil and connected by a tang to a root, the roots of the blades being engaged in grooves at the periphery of the disk and their tangs leaving between them spaces for housing the sheets, at least one airflow space being formed between the internal faces of the platforms and said sheets, the sheets including air-passing holes for feeding the or each space with air and for cooling the platforms, wherein the platforms include discrete studs or lugs on their radially internal faces that form discrete projections against which the sheets bear radially and that define radial clearance between the sheets and the internal faces of the platforms, and that allow the air from each air-passing hole to flow all around the studs or lugs and along the radially internal faces of the platforms, each platform further comprising at least one through orifice exhausting the air outside the airflow spaces.

2. A wheel according to claim 1, wherein the radial clearance between a sheet and the internal face of the platform is about 1 mm, the clearance between said sheet and the tangs of the blades being substantially zero.

3. A wheel according to claim 1, wherein the studs or lugs are arranged along a line substantially parallel to the longitudinal axis of the wheel and are regularly spaced apart from one another.

4. A turbine wheel according to claim 1, wherein each sheet has at least one or two rows of holes, the or each row of holes extending substantially parallel to the longitudinal axis of the wheel.

5. A wheel according to claim 1, wherein each sheet is in the form of an elongate dish with its concave side facing radially inwards and with its end wall including the above-mentioned holes.

6. A wheel according to claim 5, wherein the end wall of each sheet has a cross section of undulating shape including an outwardly convex middle portion situated between two outwardly concave side portions, the middle portion bearing radially outwards against circumferential end portions of the platforms of two adjacent blades.

7. A turbine engine, including at least one turbine wheel according to claim 1.

8. A wheel according to claim 1, wherein said discrete studs or lugs do not extend along an entire extent of the platform.

9. A wheel according to claim 1, wherein said discrete studs or lugs are configured such that the air within said radial clearance flows from upstream to downstream around said discrete studs or lugs and exits said radial clearance via said orifice.

10. A wheel according to claim 1, wherein said air-passing holes of the sheets and said discrete studs or lugs are arranged in a staggered configuration.

11. A wheel according to claim 1, wherein said discrete studs or lugs are shaped and positioned such that the air circulates longitudinally within said radial clearance around said studs or lugs.

* * * * *